(12) United States Patent
Weber et al.

(10) Patent No.: US 12,374,009 B2
(45) Date of Patent: Jul. 29, 2025

(54) MULTI-CAMERA FACE SWAPPING

(71) Applicant: DISNEY ENTERPRISES, INC., Burbank, CA (US)

(72) Inventors: Romann Matthew Weber, Uster (CH); Evan Matthew Goldberg, Burbank, CA (US); Jacek Krzysztof Naruniec, Windlach (CH); Christopher Richard Schroers, Uster (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 426 days.

(21) Appl. No.: 17/930,157

(22) Filed: Sep. 7, 2022

(65) Prior Publication Data
US 2024/0078726 A1  Mar. 7, 2024

(51) Int. Cl.
*G06T 11/60* (2006.01)
*G06V 40/16* (2022.01)
*H04N 13/204* (2018.01)

(52) U.S. Cl.
CPC ............ *G06T 11/60* (2013.01); *G06V 40/172* (2022.01); *H04N 13/204* (2018.05)

(58) Field of Classification Search
None
See application file for complete search history.

(56) References Cited

U.S. PATENT DOCUMENTS 9,750,420 B1 * 9/2017 Agrawal ............... G06T 7/73
9,953,216 B2 * 4/2018 Alvarez ............... G06F 3/017
10,902,571 B2   1/2021 Naruniec et al.
11,010,944 B2   5/2021 De la Torre et al.
11,222,466 B1 * 1/2022 Naruniec ............ G06N 3/088

FOREIGN PATENT DOCUMENTS

CN   104156993 A   11/2014
CN   112766160 A   5/2021
WO   2021083069 A1  5/2021

OTHER PUBLICATIONS

Bitouk D. et al., "Face Swapping: Automatically Replacing Faces in Photographs", Columbia University, Aug. 1, 2008, 8 pages.

(Continued)

*Primary Examiner* — Darryl V Dottin
(74) *Attorney, Agent, or Firm* — Squire Patton Boggs LLP; Sarah Mirza

(57) ABSTRACT

One embodiment of the present invention sets forth a technique for performing face swapping. The technique includes converting a first input image that depicts a first facial identity from a first viewpoint at a first time into a first latent representation and converting a second input image that depicts the first facial identity from a second viewpoint at the first time into a second latent representation. The technique also includes generating, via a first machine learning model, a first output image that depicts a second facial identity from the first viewpoint based on the first latent representation. The technique further includes generating, via the first machine learning model, a second output image that depicts the second facial identity from the second viewpoint based on the second latent representation.

18 Claims, 4 Drawing Sheets

(56) References Cited

OTHER PUBLICATIONS

Kosov S. et al., "Rapid stereo-vision enhanced face detection", Max-Planck-Institut Informatik, Saarbrucken, Germany, Dec. 2009, 5 pages.

Umlauf G., "Accurate Real-Time Multi-Camera Stereo-Matching on the GPU for 3D Reconstruction", HTWG Konstanz, Germany, Jan. 2011, 9 pages.

Naruniec et al. U.S. patent application entitled, "Face Swapping With Neural Network-Based Geometry Refining", U.S. Appl. No. 17/484,681, filed Sep. 24, 2021, 53 pages.

Hemlinger et al., U.S. patent application entitled, "Tunable Models for Changing Faces in Images", U.S. Appl. No. 16/850,898, filed Apr. 16, 2020, 44 pages.

\* cited by examiner

MULTI-CAMERA FACE SWAPPING

BACKGROUND

Field of the Various Embodiments

Embodiments of the present disclosure relate generally to machine learning and computer vision and, more specifically, to techniques for performing multi-camera face swapping.

Description of the Related Art

Face swapping refers to the changing of the facial identity of an individual in standalone images or video frames while maintaining the performance of the individual within the standalone images or video frames. This facial identity includes aspects of a facial appearance that arise from differences in personal identities, ages, lighting conditions, and/or other factors. For example, two different facial identities may be attributed to two different individuals, the same individual under different lighting conditions, and/or the same individual at different ages. Further, the performance of an individual, which also is referred to as the dynamic behavior of an individual, includes the facial expressions and poses of the individual, as depicted in the video frames or in standalone images.

Face swapping can be conducted under various types of scenarios. For example, the facial identity of an actor within a given scene of video content (e.g., a film, a show, etc.) could be changed to a different facial identify of the same actor at a younger age or at an older age. In another example, a first actor could be unavailable for a video shoot because of scheduling conflicts, because the first actor is deceased, and/or for other reasons. To incorporate the likeness of the first actor into video content generated during the shoot, footage of a second actor could be captured during the shoot, and the face of the second actor in the footage could be replaced with the face of the first actor afterwards.

Existing face swapping techniques can utilize neural network models or computer graphics (CG) morphable models to change facial identities in video frames and images in a photorealistic manner. However, existing CG morphable model techniques frequently rely on imperfect geometry of faces, without being able to correct for such imperfections. "Perfect" geometry refers to geometric data (e.g., depth maps, point clouds, meshes, etc.) that accurately represents the geometry of a face and head and can be used to provide ground truth information about the geometry of the face. For example, perfect geometry can be obtained from high-precision scans of a face and head. By contrast, "imperfect" geometry refers to geometric data that does not accurately represent the geometry of the face and head and/or that contains errors or other imperfections. For example, imperfect geometry can include geometric data obtained from images without using high-precision scans. The imperfect geometry can produce unwanted artifacts that look unrealistic after facial identities are changed in video frames and images. Further, some existing neural network techniques do not account for the geometry of faces. As a result, such techniques can produce unrealistic-looking facial changes in video frames and images that include faces in profile views or other extreme poses.

As the foregoing illustrates, what is needed in the art are more effective techniques for changing facial identifies in video frames and images.

SUMMARY

One embodiment of the present invention sets forth a technique for performing face swapping. The technique includes converting a first input image that depicts a first facial identity from a first viewpoint at a first time into a first latent representation and converting a second input image that depicts the first facial identity from a second viewpoint at the first time into a second latent representation. The technique also includes generating, via a first machine learning model, a first output image that depicts a second facial identity from the first viewpoint based on the first latent representation. The technique further includes generating, via the first machine learning model, a second output image that depicts the second facial identity from the second viewpoint based on the second latent representation.

One technical advantage of the disclosed techniques relative to the prior art is that 3D geometry derived from multiscopic images of faces can be used to improve the geometric consistency associated with changing facial identities within the multiscopic images. In this regard, the disclosed techniques can be used to train a machine learning model in a way that detects and corrects for discrepancies in the shapes or positions of eyes, mouths, or other facial features between the facial identities depicted in the original multiscopic images and the changed facial identities in the corresponding multiscopic images outputted by the machine learning model. Another technical advantage of the disclosed techniques is the ability to use the 3D geometry derived from a given set of multiscopic images to measure the geometric consistency of any machine learning model that performs face swapping within the set of multiscopic images. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
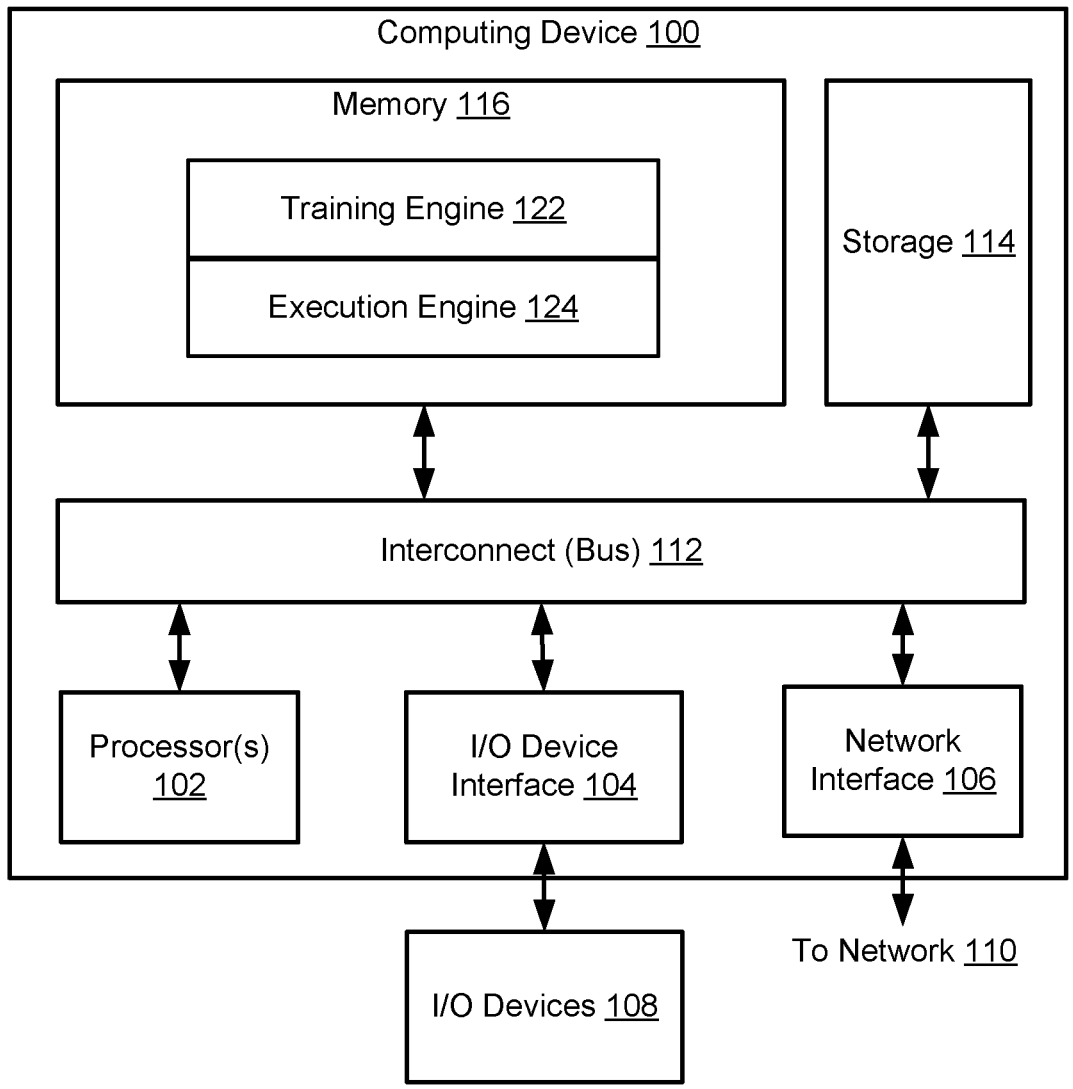
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and an execution engine 124 that reside in a memory 116.

It is noted that the computing device described herein is illustrative and that any other technically feasible configurations fall within the scope of the present disclosure. For example, multiple instances of training engine 122 and execution engine 124 could execute on a set of nodes in a distributed and/or cloud computing system to implement the functionality of computing device 100. In another example, training engine 122 and/or execution engine 124 could execute on various sets of hardware, types of devices, or environments to adapt training engine 122 and/or execution engine 124 to different use cases or applications. In a third example, training engine 122 and execution engine could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In some embodiments, training engine 122 trains one or more machine learning models to perform face swapping, in which the facial identity of an individual in one or more images or video frames is changed while maintaining the performance of the individual within the image(s) or video frame(s). Execution engine 124 executes the machine learning model(s) to convert input images that include certain facial identities and performances into output images that include different facial identities and the same performances.

More specifically, training engine 122 and execution engine 124 are configured to train and execute a machine learning model that performs face swapping using multiscopic data. This multiscopic data includes two or more images captured at the same time from two or more viewpoints. For example, the multiscopic data could include stereoscopic pairs of images that are captured by two cameras from viewpoints corresponding to the left and right eyes of a viewer. The multiscopic data can be used to estimate a three-dimensional (3D) geometry associated with the scene captured by the images at a given point. As described in further detail below, the estimated 3D geometry can then be used to evaluate or improve the face-swapping performance of the machine learning model(s).

Multi-Camera Face Swapping

Figure 2:
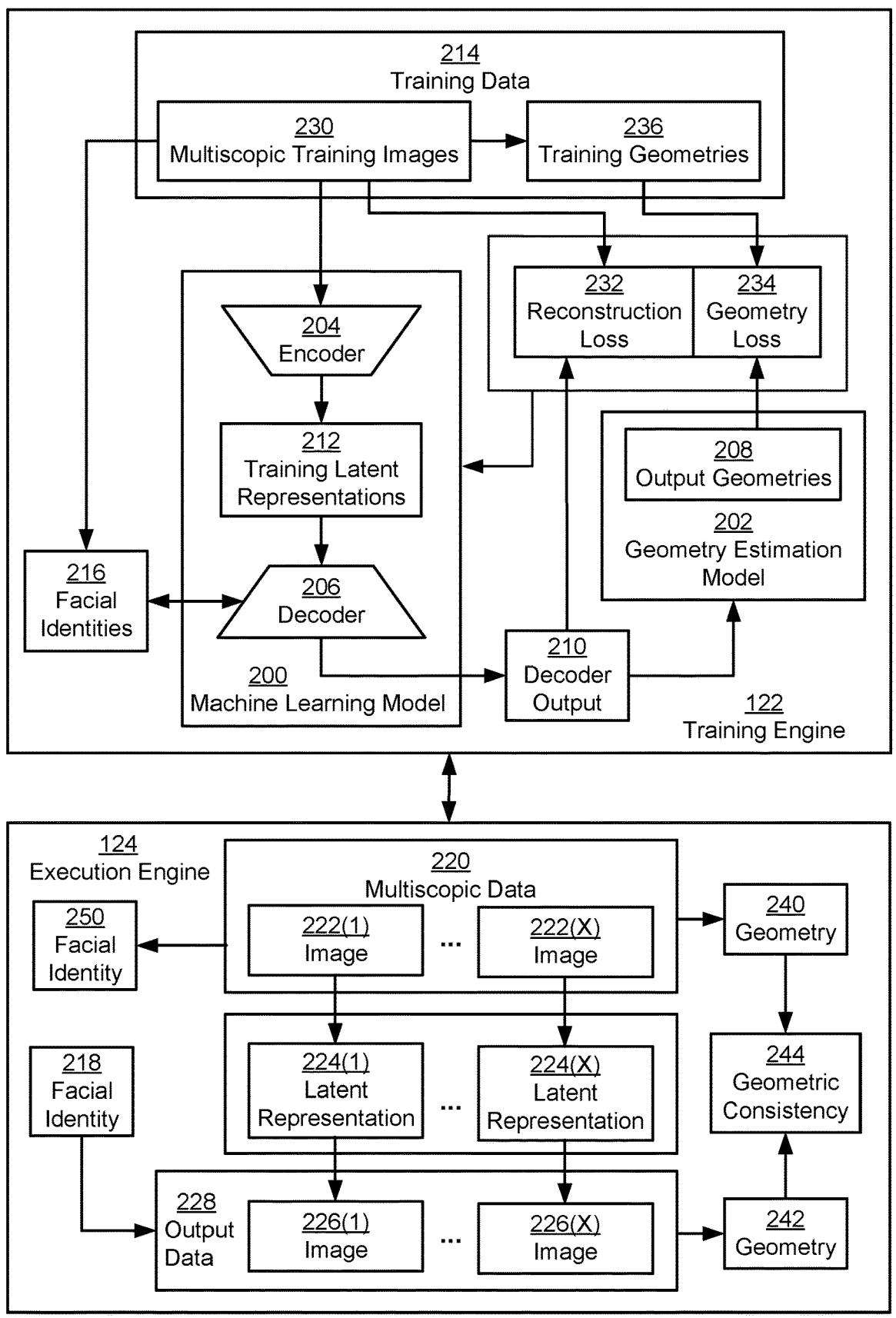
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. As mentioned above, training engine 122 and execution engine 124 operate to train and execute a machine learning model 200 that changes a facial identity 250 associated with multiscopic data 220, which includes multiple images 222(1)-221(X) (each of which is referred to individually as image 222) that capture or depict facial identity 250 at a certain point in time from different viewpoints. For example, multiscopic data 220 could include one or more pairs of stereoscopic images (or video frames) that are captured by two different cameras with a known offset from one another. In another example, multiscopic data 220 could include three or more images (or video frames) that are captured at the same time by three or more cameras from three or more viewpoints. In a third example, multiscopic data 220 could include stereoscopic or multiscopic images that are generated from monocular images using a two-dimensional (2D) to 3D stereo conversion technique.

As shown in FIG. 2, machine learning model 200 includes an encoder 204 and a decoder 206. In various embodiments, encoder 204 and decoder 206 are implemented as neural networks. Input into encoder 204 includes multiple images 222 that depict a scene at a certain time from different viewpoints.

In some embodiments, each image 222 includes a normalized image of a face associated with facial identity 250. This face can include (but is not limited to) a human face, an animal face, an animated face, a computer-generated face, and/or another representation of a region of a head that can be used to uniquely identify a human or non-human individual. Within the normalized image, landmarks or features of the face are aligned to match landmarks of a generic face with a neutral expression. As a result, facial features (e.g., eyes, ears, nose, etc.) are at similar locations across the normalized images. The normalized image can also be cropped to a predefined size. To generate the normalized image, training engine 122 and/or execution engine 124 can rotate, scale, translate, crop, and/or otherwise process an original "non-normalized" image, such as an image of the face captured by a camera. Training engine 122 and/or execution engine 124 can also, or instead, use a deep alignment network (DAN) (or another technique or machine learning model) to detect the largest face in each image 222 and determine the locations of facial landmarks in the largest face. Training engine 122 and/or execution engine 124 can then rotate, translate, crop, scale, and/or otherwise transform or process the image so that the eyes of the largest face lie on a predefined horizontal line and have a predefined ocular distance.

Encoder 204 converts each of images 222(1)-222(X) into corresponding latent representations 224(1)-224(X) (each of which is referred to individually as latent representation 224). Decoder 206 converts latent representations 224 into output data 228 that includes images 226(1)-226(X) (each of which is referred to as image 226) with a different facial identity 218 from that of images 222.

In one or more embodiments, machine learning model 200 is an autoencoder that includes encoder 204 and decoder 206. Encoder 204 includes convolutional layers and/or other types of neural network layers that convert a 2D image 222 that depicts facial identity 250 into a corresponding latent representation 224. This latent representation 224 includes a fixed-length vector representation of the visual attributes in image 222 in a lower-dimensional space.

Input into decoder 206 includes latent representation 224 from encoder 204 and a representation of a certain facial identity 218 that is different from facial identity 250 depicted in images 222. Given this input, convolutional layers and/or other types of neural network layers in decoder 206 generate an output image 226 that includes the different facial identity 218 (e.g., personal identity, age, lighting conditions, etc.) while retaining the performance (e.g., behavior, facial expression, pose, etc.) from the original image 222.

For example, facial identity 218 could be represented by a set of densely connected neural network layers (also referred to herein as "dense layers") that operate in conjunction with decoder 206. Input into each dense layer could include an output of a corresponding layer of decoder 206. In response to the input, the dense layer generates parameters that control the operation of one or more subsequent layers within decoder 206 and/or the values of weights within the subsequent layer(s). These parameters could include adaptive instance normalization (AdaIN) coefficients that represent facial identity 218. These parameters could also, or instead, include weights associated with neurons within the subsequent layer(s) of decoder 206. The outputted AdaIN coefficients and/or weights would be used to modify convolutional operations performed by the subsequent layer(s) in decoder 206, thereby allowing decoder 206 to generate images 226 with different facial identities.

Continuing with the above example, when facial identity 218 corresponds to an interpolation between two or more facial identities represented by two or more sets of dense layers, a weighted combination of AdaIN coefficients (or neural network weights) outputted by the two or more sets of dense layers could be used to control the convolutional operations performed by the layers of decoder 206. Thus, a given facial identity 218 that corresponds to 80% of a first facial identity associated with a first set of dense layers and 20% of a second facial identity associated with a second set of dense layers could be represented by a weighted sum of AdaIN coefficients (or neural network weights) outputted by the first and second sets of dense layers. Within the weighted sum, the AdaIN coefficients (or neural network weights) outputted by the first set of dense layers would be combined with a weight of 0.8, and the AdaIN coefficients (or neural network weights) outputted by the second set of dense layers would be combined with a weight of 0.2.

In another example, a single set of dense layers could be trained to learn multiple facial identities denoted by multiple corresponding identity vectors. The operation of this set of dense layers could be controlled by inputting an identity vector that represents a single facial identity 218 and/or a combination of facial identities into the set of dense layers. In response to the inputted identity vector and output from various layers of decoder 206, the dense layers generate AdaIN coefficients and/or neural network weights that control the operation of subsequent layers of decoder 206. These AdaIN coefficients and/or neural network weights allow decoder 206 to generate images 226 with different facial identities and/or mixes of facial identities.

In a third example, machine learning model 200 could include multiple decoders representing multiple facial identities. During training, each decoder 206 could learn a representation of a corresponding facial identity (e.g., facial identity 218) from a set of images that capture the facial identity. After a given decoder 206 is trained, that decoder 206 can be used to convert latent representations 224 of one or more images 222 into one or more corresponding images 226 that depict the learned facial identity.

Training engine 122 trains machine learning model 200 using training data 214 that includes multiple sets of multiscopic training images 230 associated with multiple facial identities 216. Each set of multiscopic training images 230 includes two or more images that depict a face at a given time from different viewpoints. Each set of multiscopic training images 230 also, or instead, includes two or more rendered images (e.g., computer-generated images) of a face from different viewpoints.

In some embodiments, multiscopic training images 230 include a set of video streams that depict or capture the same face from different viewpoints. These video streams could also be captured or rendered under similar environmental and lighting conditions.

Multiscopic training images 230 can additionally include normalized images of the corresponding faces. As described above, these normalized images can be cropped and/or resized to have a certain resolution. These normalized images can also include eyes, noses, and/or other facial features or landmarks at similar locations.

Training data 214 also includes training geometries 236 associated with multiscopic training images 230. Each of training geometries 236 includes a depth map, 3D mesh, point cloud, and/or another representation of the 3D geometry associated with the face depicted in a corresponding set of multiscopic training images 230. Each of training geometries 236 can be determined using a depth sensor, 3D scanner, machine learning model, stereo matching technique, and/or another technique that can be used to derive 3D geometry information associated with 2D images of the same scene.

During training of machine learning model 200, training engine 122 inputs each set of multiscopic training images 230 into encoder 204. Training engine 122 uses encoder 204 to convert the inputted multiscopic training images 230 into corresponding training latent representations 212. Training engine 122 also uses an instance of decoder 206 to convert each of training latent representations 212 into decoder output 210 that includes a corresponding image. Training engine 122 then trains encoder 204 and decoder 206 based on a reconstruction loss 232 between decoder output 210 and the corresponding multiscopic training images 230.

For example, training engine 122 could perform a forward pass that uses encoder 204 to convert a batch of multiscopic training images 230 into corresponding training latent representations 212 and uses one or more instances of decoder 206 to convert training latent representations 212 into decoder output 210. Training engine 122 could compute a mean squared error (MSE), L1 loss, and/or another type of reconstruction loss 232 that measures the differences between multiscopic training images 230 and decoder output 210 that corresponds to reconstructions of multiscopic training images 230. Training engine 122 could then perform a backward pass that backpropagates reconstruction loss 232 across layers of machine learning model 200 and uses stochastic gradient descent to update parameters (e.g., neural network weights) of machine learning model 200 based on the negative gradients of the backpropagated reconstruction loss 232. Training engine 122 could repeat the forward and backward passes with different batches of training data 214 and/or over a number of training epochs and/or iterations until reconstruction loss 232 falls below a threshold and/or another condition is met.

By training machine learning model 200 in a way that minimizes reconstruction loss 232, training engine 122 generates a trained encoder 204 that learns lower-dimensional latent representations 224 of multiscopic training images 230. Training engine 122 also generates one or more instances of a trained decoder 206 that learn different facial identities 216 associated with multiscopic training images 230 and can reconstruct the original multiscopic training images 230 from the corresponding latent representations 224 outputted by the trained encoder 204.

While the training of machine learning model 200 using reconstruction loss 232 has been described above with respect to multiscopic training images 230, it will be appreciated that machine learning model 200 can also, or instead, be trained using reconstruction loss 232 to reproduce other types of images. For example, training engine 122 could train machine learning model 200 in a way that minimizes reconstruction loss 232 between individual still images of faces, individual video streams of faces, and/or other types of non-multiscopic images inputted into machine learning model 200 and reconstructions of these non-multiscopic images outputted by machine learning model 200.

After machine learning model 200 has been trained to reconstruct multiscopic training images 230 and/or non-multiscopic training images, training engine 122 further trains machine learning model 200 based on a geometry loss 234 between training geometries 236 associated with different sets of multiscopic training images 230 and output geometries 208 associated with decoder output 210 generated by machine learning model 200 from these sets of multiscopic training images 230. More specifically, training engine 122 inputs a given set of multiscopic training images 230 into encoder 204 and uses encoder 204 to convert the inputted multiscopic training images 230 into corresponding training latent representations 212. Training engine 122 also uses one or more instances of decoder 206 associated with one or more facial identities 216 to convert each of training latent representations 212 into decoder output 210 that includes an output image. This output image would depict the performance from the original image that was converted into the training latent representation and a selected facial identity that differs from the original image.

Training engine 122 then uses a geometry estimation model 202 to estimate one or more output geometries 208 from the reconstructions of multiscopic training images 230 in decoder output 210. Training engine 122 also computes geometry loss 234 between the estimated output geometries 208 and one or more corresponding "ground truth" training geometries 236 for the inputted set of multiscopic training images 230. Training engine 122 additionally trains encoder 204 and decoder 206 based on the computed geometry loss 234.

For example, training engine 122 could perform a forward pass that uses encoder 204 to convert a batch of multiscopic training images 230 into corresponding training latent representations 212. Training engine 122 also uses one or more instances of decoder 206 and/or one or more sets of dense layers to convert training latent representations 212 into decoder output 210 that includes images that retain the performances of multiscopic training images 230 but have different facial identities 216 from those of multiscopic training images 230. Training engine 122 could use a pre-trained "depth estimation" machine learning model, a stereo matching technique, and/or another type of computer vision or machine learning technique implemented by geometry estimation model 202 to estimate depth maps, 3D meshes, and/or other output geometries 208 associated with the reconstructions of the batch of multiscopic training images 230. Training engine 122 could use the same geometry estimation model 202 and/or a different geometry estimation technique to estimate training geometries 236 associated with multiscopic training images 230, or training engine 122 could retrieve training geometries 236 from a repository in which training data 214 is stored.

Continuing with the above example, training engine 122 could compute an MSE, L1 loss, and/or another type of geometry loss 234 that measures the differences between training geometries 236 associated with the batch of multiscopic training images 230 (or certain facial features or landmarks in training geometries 236) and output geometries 208 estimated from the reconstructions of the batch of multiscopic training images 230 (or certain facial features or landmarks in output geometries 208). When geometry estimation model 202 estimates multiple training geometries 236 and/or multiple output geometries 208 from multiple subsets of images (e.g., pairs of stereoscopic images) within a larger set of multiscopic training images 230 that depict the same face, training engine 122 could compute a separate geometry loss 234 between each training geometry estimated from a pair of images in multiscopic training images 230 and an output geometry estimated from a corresponding pair of images in decoder output 210. Training engine 122 could then perform a backward pass that backpropagates geometry loss 234 across layers of machine learning model 200 and uses stochastic gradient descent to update parameters (e.g., neural network weights) of machine learning model 200 based on the negative gradients of the backpropagated geometry loss 234. Training engine 122 could repeat the forward and backward passes with different batches of training data 214 and/or over a number of training epochs and/or iterations until geometry loss 234 falls below a threshold and/or another condition is met.

By training machine learning model 200 in a way that minimizes geometry loss 234, training engine 122 generates a trained machine learning model 200 that learns to perform face swapping in a geometrically consistent manner. For example, training engine 122 could use geometry loss 234 to penalize differences in the shapes and/or positions of various facial features (e.g., eyes, mouths, eyebrows, etc.) between a set of multiscopic training images 230 and a corresponding set of "face swapped" images in decoder output 210.

Training engine 122 can also repeat training of machine learning model 200 using reconstruction loss 232 and/or geometry loss 234. For example, training engine 122 could alternate between one training stage that updates parameters of machine learning model 200 based on reconstruction loss 232 and another training stage that updates parameters of machine learning model 200 based on geometry loss 234 until one or both losses fall below corresponding thresholds. In another example, training engine 122 could perform one or more stages that train machine learning model 200 using a combination (e.g., sum) of reconstruction loss 232 and geometry loss 234. Thus, by training machine learning model 200 using both reconstruction loss 232 and geometry loss 234, training engine 122 improves the performance of machine learning model 200 both in reconstructing images of faces and in generating images with changed facial identities 216 in a geometrically consistent way.

Execution engine 124 uses the trained machine learning model 200 to convert multiscopic data 220 that includes images 222 depicting a certain facial identity 250 and a certain performance (e.g., behavior, facial expression, pose, etc.) from multiple viewpoints into output data 228 that includes images 226 depicting a different facial identity 218 and the same performance from the same viewpoints. More specifically, execution engine 124 receives a set of multiscopic images 222 of a face at a certain time with a certain facial identity 250. Each image 222 in the set of multiscopic images depicts the face from a different viewpoint. Execution engine 124 uses the trained encoder 204 to convert each image 222 into a corresponding latent representation 224. Execution engine 124 also uses the trained decoder 206 to convert each latent representation 224 into a corresponding image 226 that includes the same performance and viewpoint as the original image represented by the latent representation but depicts a face with a different facial identity 218 than that of the original image. As mentioned above, this facial identity 218 can be represented by a certain instance of decoder 206, an identity vector, and/or a set of dense layers that generate AdaIN coefficients or neural network weights that control the operation of decoder 206.

Execution engine 124 can also perform face swapping for multiple sets of images 222 within multiscopic data 220. For example, multiscopic data 220 could include multiple video streams that depict a face with a certain facial identity 250 and a certain performance from different viewpoints. Execution engine 124 could retrieve, from these video streams, a set of images 222 that includes multiple video frames depicting the face at the same point in time. Execution engine 124 could also use machine learning model 200 to convert these images 222 into a corresponding set of images 226 that depict a face with a different facial identity 218 and the same performance from the same viewpoints. Execution engine 124 could repeat the process with all video frames in the video streams, thereby generating a new set of video streams that include the new facial identity 218 while retaining the performance depicted in multiscopic data 220.

After machine learning model 200 generates output data 228 that includes a set of images 226 with a different facial identity 218 from the original facial identity 250 depicted within a corresponding set of input images 222, execution engine 124 can use geometry estimation model 202 to assess a geometric consistency 244 between images 222 and images 226. In some embodiments, geometric consistency 244 includes a measure of the distance or difference between a first geometry 240 associated with two or more images 222 and a second geometry 242 associated with two or more corresponding images 226. For example, geometric consistency 244 could include an aggregation (e.g., average, weighted average, sum, weighted sum, etc.) of distances between 3D points in geometry 240 and corresponding 3D points in geometry 242.

More specifically, execution engine 124 can use geometry estimation model 202 to estimate a first geometry 240 (e.g., depth map, 3D mesh, point cloud etc.) for a first facial identity 250 depicted in images 222 and a second geometry 242 for a second facial identity 218 depicted in images 226. Execution engine 124 can also compute geometric consistency 244 as geometry loss 234 and/or another measure of the difference between the two 3D geometries. Execution engine 124 can additionally output the computed measure as an indicator of geometric consistency 244 between facial identity 250 depicted in images 222 and facial identity 218 depicted in images 226. Execution engine 124 can also, or instead, use one or more thresholds for the computed measure to convert the measure into a "geometric consistency rating" for the face-swapping performance of machine learning model 200. For example, execution engine 124 could convert the measure into a numeric geometric consistency rating of 1, 2, 3, 4, or 5 by mapping the measure into one of five "buckets" or "ranges" of values. A higher geometric consistency rating could represent a smaller difference (and therefore greater geometric consistency 244) between geometries 240 and 242, and a lower geometric consistency rating could represent a greater difference (and therefore lower geometric consistency 244) between geometries 240 and 242.

In some embodiments, execution engine 124 uses geometry estimation model 202 in a "diagnostic tool" that measures geometric consistency 244 for any machine learning model that changes the facial identity in a given set of multiscopic images (e.g., images 222). For example, this diagnostic tool could be used to assess the performance of machine learning model 200 after machine learning model 200 has been trained based on reconstruction loss 232 and/or geometry loss 234. In another example, this diagnostic tool could be used to evaluate geometric consistency 244 between an original set of multiscopic images inputted into any machine learning model and a corresponding set of multiscopic images with a different facial identity produced by the machine learning model, even when the machine learning model has not been trained using multiscopic images and/or geometry loss 234.

In one or more embodiments, output data 228 that includes images 226 with a different facial identity 218 from facial identity 250 depicted in a corresponding set of input images 222 is used as content in an immersive environment, such as (but not limited to) a virtual reality (VR), augmented reality (AR), and/or mixed reality (MR) environment. This content can depict virtual worlds that can be experienced by any number of users synchronously and persistently, while providing continuity of data such as (but not limited to) personal identity, user history, entitlements, possession, and/or payments. It is noted that this content can include a hybrid of traditional audiovisual content and fully immersive VR, AR, and/or MR experiences, such as interactive video.

For example, multiscopic data 220 could include pairs of stereoscopic images 222 (or video frames) that are rendered from a 3D model or scene and/or generated from monoscopic images (or video frames) using a 2D to 3D conversion technique. Images 222 could depict a person, avatar, and/or another real or synthetic individual associated with facial identity 250 from two or more viewpoints. Execution engine 124 could use machine learning model 200 to replace facial identity 250 depicted in images 222 with a different facial identity 218 of a different individual (e.g., an avatar associated with the individual, an animated version of the individual, an "alter-ego" of the individual in the immersive environment, etc.) in images 226. Execution engine 124 could then output images 226 for viewing on a screen (e.g., as a 3D movie or show) and/or on an AR/VR/MR headset or device as part of an immersive experience.

Figure 3:
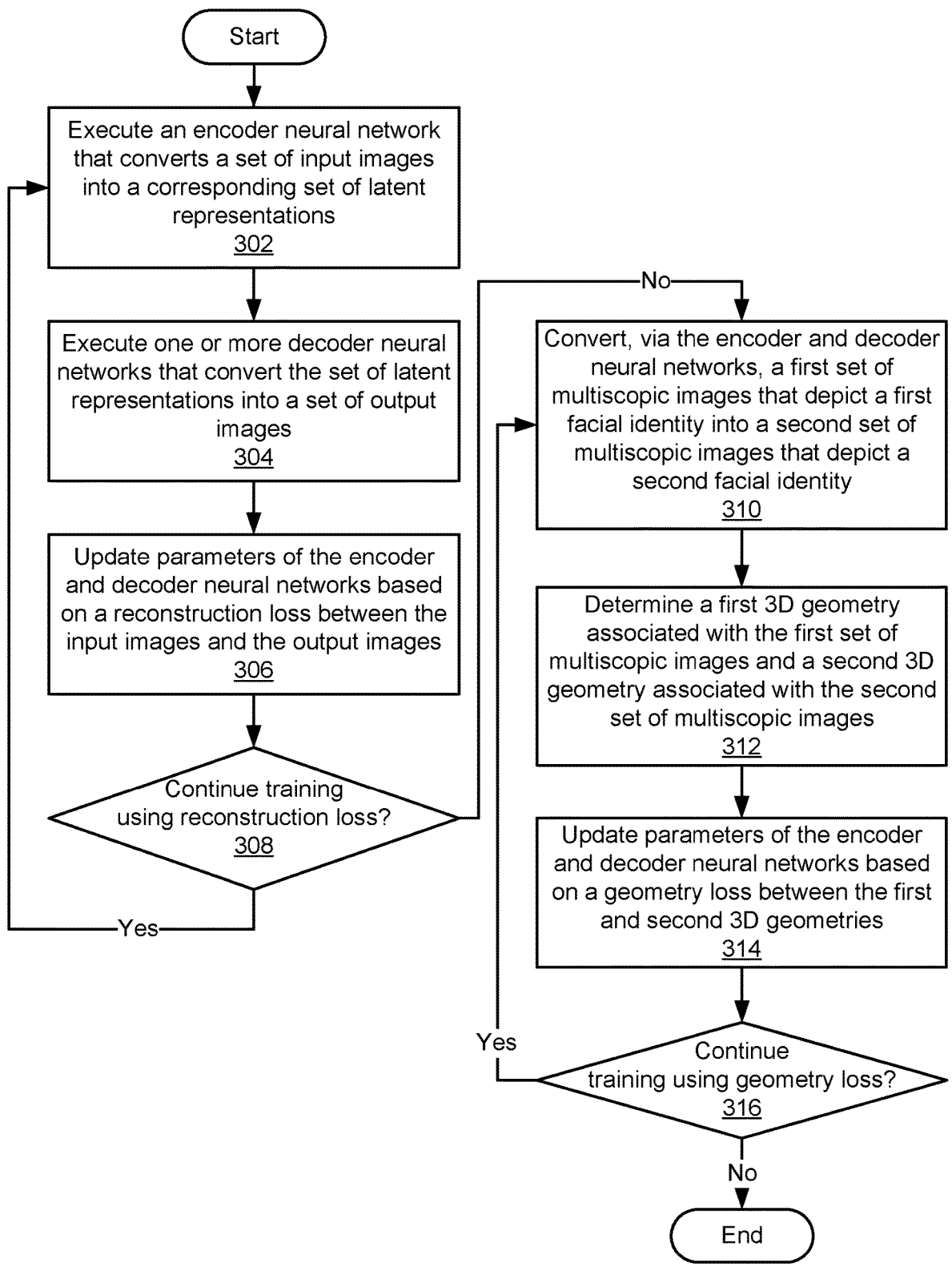
FIG. 3 is a flow diagram of method steps for training a neural network to perform face swapping, according to various embodiments.

FIG. 3 is a flow diagram of method steps for training a neural network to perform face swapping, according to various embodiments. Although the method steps are described in conjunction with the systems of FIGS. 1-2, persons skilled in the art will understand that any system configured to perform the method steps in any order falls within the scope of the present disclosure.

As shown, in step 302, training engine 122 executes an encoder neural network that converts a set of input images into a corresponding set of latent representations. For example, training engine 122 could input normalized images of faces with different facial identities into the encoder neural network. Training engine 122 could also use one or more convolutional layers and/or other types of neural network layers in the encoder neural network to convert each normalized image into a corresponding latent representation in a lower-dimensional vector space.

In step 304, training engine 122 executes one or more decoder neural networks that convert the set of latent representations into a set of output images. Continuing with the above example, training engine 122 could input some or all of the latent representations into each decoder neural network. Training engine 122 could use one or more convolutional layers and/or other types of neural network layers in the decoder neural network to convert the latent representations into the output images.

As mentioned above, the input images can depict multiple facial identities (e.g., combinations of personal identities, ages, lighting conditions, etc.). Each of these facial identities can be learned by a different decoder neural network. As a result, training engine 122 can perform step 304 by inputting different subsets of latent representations associated with different facial identities into different decoder neural networks and using each decoder neural network to convert the corresponding subset of latent representations into output images.

Alternatively, the same decoder neural network can be used to convert all latent representations generated by the encoder neural network into output images. In this scenario, one or more sets of dense layers are used to generate AdaIN coefficients, neural network weights, and/or other parameters that control the operation of the decoder neural network in converting the latent representations into the output images. These parameters can be adapted to different facial identities associated with the original input images.

In step 306, training engine 122 updates parameters of the encoder and decoder neural networks based on a reconstruction loss between the input images and the output images. For example, the reconstruction loss could include a MSE, L1 loss, and/or another measure of the differences in pixel values between the input images and the output images.

Training engine 122 could compute the reconstruction loss for a certain batch of output images produced by the decoder neural network(s). Training engine 122 could then use gradient descent and backpropagation to update neural network weights in the encoder and decoder neural networks in a way that reduces the reconstruction loss.

In step 308, training engine 122 determines whether or not training using the reconstruction loss is to continue. For example, training engine 122 could determine that the encoder and decoder neural networks should continue to be trained using the reconstruction loss until one or more conditions are met. These condition(s) include (but are not limited to) convergence in the parameters of the encoder and decoder neural networks, the lowering of the reconstruction loss to below a threshold, and/or a certain number of training steps, iterations, batches, and/or epochs. While training for reconstruction continues, training engine 122 repeats steps 302, 304, and 306.

Once training engine 122 determines that training using the reconstruction loss is no longer to be continued (step 308), training engine 122 proceeds to training the encoder and decoder neural networks for geometric consistency. As shown, in step 310, training engine 122 converts, via the encoder and decoder neural networks, a first set of multiscopic images that depict a first facial identity into a second set of multiscopic images that depict a second facial identity that is different from the first facial identity. For example, training engine 122 could receive two or more input images that depict a first face with the first facial identity at a given point in time from two or more viewpoints. Training engine 122 could use the encoder neural network to convert the images into corresponding latent representations. Training engine 122 could also use a decoder neural network, a set of dense layers, an identity vector representing the second facial identity, and/or another representation of the second facial identity to convert the latent representations into two or more output images that depict a second face with the second facial identity (e.g., a face with a different personal identity, set of lighting conditions, age, etc. than that of the first facial identity) and the performance from the input images.

In step 312, training engine 122 determines a first 3D geometry associated with the first set of multiscopic images and a second 3D geometry associated with the second set of multiscopic images. Continuing with the above example, training engine 122 could use a pre-trained geometry estimation model, stereo matching technique, and/or another type of machine learning or computer vision technique to estimate a depth map, mesh, and/or another geometric representation of a face depicted in the input images. Training engine 122 could use the same technique and/or a different technique to estimate a depth map, mesh, and/or another geometric representation of a face depicted in the output images.

In step 314, training engine 122 updates parameters of the encoder and decoder neural networks based on a geometry loss between the first and second 3D geometries. For example, the geometry loss could include an MSE and/or another measure of the differences in depth values, vertex locations, and/or other values in the first and second 3D geometries. Training engine 122 could then use gradient descent and backpropagation to update neural network weights in the encoder and decoder neural networks in a way that reduces the geometry loss.

In step 316, training engine 122 determines whether or not training using the geometry loss is to continue. For example, training engine 122 could determine that the encoder and decoder neural networks should continue to be trained using the geometry loss until one or more conditions are met. These condition(s) include (but are not limited to) convergence in the parameters of the encoder and decoder neural networks, the lowering of the geometry loss to below a threshold, and/or a certain number of training steps, iterations, batches, and/or epochs. While training for geometric consistency continues, training engine 122 repeats steps 310, 312, and 314. Training engine 122 then ends the process of training the encoder and decoder neural networks once the condition(s) are met.

Training engine 122 can also repeat steps 302, 304, 306, 308, 310, 312, 314, and/or 316 one or more times to continue training the encoder and decoder neural networks using the reconstruction loss and/or geometry loss. For example, training engine 122 could alternate between training the encoder and decoder neural networks using the reconstruction loss and training the encoder and decoder neural networks using the geometry loss until both the reconstruction loss and geometry loss meet the respective thresholds, each type of training has been performed a certain number of times, and/or another condition is met.

Figure 4:
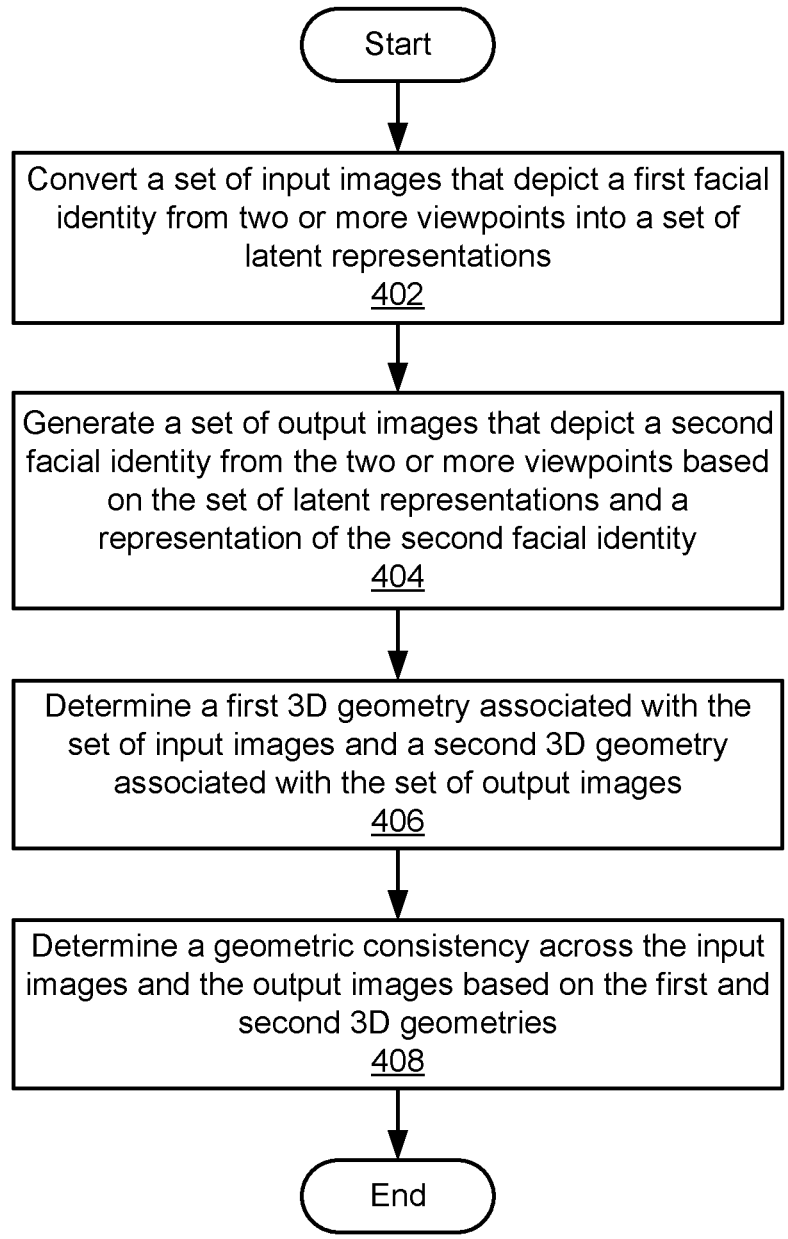
FIG. 4 is a flow diagram of method steps for performing face swapping, according to various embodiments.

FIG. 4 is a flow diagram of method steps for performing face swapping, according to various embodiments. Although the method steps are described in conjunction with the systems of FIGS. 1-2, persons skilled in the art will understand that any system configured to perform the method steps in any order falls within the scope of the present disclosure.

As shown, in step 402, execution engine 124 converts a set of input images that depict a first facial identity from two or more viewpoints into a set of latent representations. For example, execution engine 124 could receive a set of normalized stereoscopic images and/or multiscopic images of the first facial identity. Execution engine 124 could input each image into an encoder neural network and obtain a corresponding latent representation of the image as output of the encoder neural network.

In step 404, execution engine 124 generates a set of output images that depict a second facial identity from the two or more viewpoints based on the set of latent representations and a representation of the second facial identity. Continuing with the above example, execution engine 124 could input each latent representation into a decoder neural network. The decoder neural network could be specific to the second facial identity and/or be controlled using a set of dense layers based on the second facial identity. Execution engine 124 could use the decoder neural network to convert each latent representation into an output image that includes the performance of the corresponding input image and the second facial identity.

In step 406, execution engine 124 determines a first 3D geometry associated with the first set of input images and a second 3D geometry associated with the set of output images. For example, execution engine 124 could use a pre-trained geometry estimation model, stereo matching technique, and/or another type of machine learning or computer vision technique to estimate a depth map, 3D mesh, point cloud, and/or another geometric representation of the first face depicted in the input images. Execution engine 124 could use the same technique and/or a different technique to estimate another geometric representation of the second face depicted in the output images.

In step 408, execution engine 124 determines a geometric consistency across the input images and the output images based on the first and second 3D geometries. For example, execution engine 124 could compute a measure of error and/or distance between the first and second 3D geometries. Execution engine 124 could use the computed measure as an indicator of the geometric consistency between the input images and the output images, with a lower value of the computed measure representing higher geometric consistency between the input images and the output images and a higher value of the computed measure representing lower geometric consistency between the input images and the output images. Execution engine 124 could also, or instead, apply one or more thresholds to the computed value to generate a "geometric consistency rating" associated with the input images and the output images. Execution engine 124 could also, or instead, store or output the computed measure and/or rating for use in evaluating the face-swapping performance of the encoder and decoder neural networks, comparing different versions of the encoder and decoder neural networks, and/or performing additional training of the encoder and decoder neural networks.

In sum, the disclosed techniques train and execute a machine learning model to perform face swapping using multiscopic images. The multiscopic images include two or more images that depict or capture a certain facial identity at a given time from two or more viewpoints. The machine learning model includes an encoder that converts images of faces with certain facial identities into latent representations in a lower-dimensional vector space. The machine learning model also includes one or more decoders that convert the latent representations into images of the same faces or images of faces with different facial identities. The encoder and decoder(s) are initially trained to reconstruct standalone images of faces. The encoder and decoder(s) are then trained to convert various sets of input multiscopic images into corresponding sets of output multiscopic images with different facial identities in a geometrically consistent way. In particular, a stereo matching technique, depth estimation model, and/or another computer vision or machine learning technique is used to estimate a first 3D geometry associated with a given set of input multiscopic images and a second 3D geometry associated with a corresponding set of output multiscopic images produced by the encoder and decoder(s) from the set of input multiscopic images. A geometry loss that measures the error or distance between the first 3D geometry and second 3D geometry is computed, and the parameters of the encoder and decoder(s) are updated in a way that reduces the geometry loss. After the encoder and decoder(s) have been trained for both reconstruction and geometric consistency, the encoder and decoder(s) can be used to change facial identities in additional sets of multiscopic images.

One technical advantage of the disclosed techniques relative to the prior art is that 3D geometry derived from multiscopic images of faces can be used to improve the geometric consistency associated with changing facial identities within the multiscopic images. In this regard, the disclosed techniques can be used to train a machine learning model in a way that detects and corrects for discrepancies in the shapes or positions of eyes, mouths, or other facial features between the facial identities depicted in the original multiscopic images and the changed facial identities in the corresponding multiscopic images outputted by the machine learning model. Another technical advantage of the disclosed techniques is the ability to use the 3D geometry derived from a given set of multiscopic images to measure the geometric consistency of any machine learning model that performs face swapping within the set of multiscopic images. These technical advantages provide one or more technological improvements over prior art approaches.

1. In some embodiments, a computer-implemented method for performing face swapping comprises converting a first input image that depicts a first facial identity from a first viewpoint at a first time into a first latent representation; converting a second input image that depicts the first facial identity from a second viewpoint at the first time into a second latent representation; generating, via a first machine learning model, a first output image that depicts a second facial identity from the first viewpoint based on the first latent representation; and generating, via the first machine learning model, a second output image that depicts the second facial identity from the second viewpoint based on the second latent representation.

2. The computer-implemented method of clause 1, further comprising determining a first three-dimensional (3D) geometry associated with the first facial identity based on the first input image and the second input image; determining a second 3D geometry associated with the second facial identity based on the first output image and the second output image; and training the first machine learning model based on a loss associated with the first 3D geometry and the second 3D geometry.

3. The computer-implemented method of any of clauses 1-2, wherein determining the first 3D geometry and the second 3D geometry comprises applying a second machine learning model to the first input image and the second input image to produce the first 3D geometry; and applying the second machine learning model to the first output image and the second output image to produce the second 3D geometry.

4. The computer-implemented method of any of clauses 1-3, further comprising converting a third input image into a third latent representation; generating, via the first machine learning model, a third output image based on the third latent representation; and training the first machine learning model based on a loss associated with the third input image and the third output image.

5. The computer-implemented method of any of clauses 1-4, wherein the first machine learning model comprises an encoder that converts the third input image into the third latent representation and a decoder that generates the third output image based on the third latent representation.

6. The computer-implemented method of any of clauses 1-5, wherein the loss comprises a reconstruction loss between the third input image and the third output image.

7. The computer-implemented method of any of clauses 1-6, further comprising converting a source image that depicts the first facial identity from a third viewpoint into the first input image and the second input image.

8. The computer-implemented method of any of clauses 1-7, wherein generating the first output image comprises decoding the first latent representation based on a representation of the second facial identity.

9. The computer-implemented method of any of clauses 1-8, wherein the first facial identity and the second facial identity comprise at least one of a personal identity, an age, or a lighting condition.

10. The computer-implemented method of any of clauses 1-9, wherein the first input image and the second input image are captured via a stereoscopic camera.

11. In some embodiments, one or more non-transitory computer-readable media store instructions that, when executed by one or more processors, cause the one or more processors to perform the steps of converting a first input image that depicts a first facial identity from a first viewpoint at a first time into a first latent representation; converting a second input image that depicts the first facial identity from a second viewpoint at the first time into a second latent representation; generating, via a first machine learning model, a first output image that depicts a second facial identity from the first viewpoint based on the first latent representation; and generating, via the first machine learning model, a second output image that depicts the second facial identity from the second viewpoint based on the second latent representation.

12. The one or more non-transitory computer-readable media of clause 11, wherein the instructions further cause the one or more processors to perform the steps of determining a first three-dimensional (3D) geometry associated with the first facial identity based on the first input image and the second input image; determining a second 3D geometry associated with the second facial identity based on the first output image and the second output image; and training the first machine learning model based on a geometry loss that is computed between the first 3D geometry and the second 3D geometry.

13. The one or more non-transitory computer-readable media of any of clauses 11-12, wherein the first 3D geometry and the second 3D geometry are determined by at least one of a second machine learning model or a stereo matching technique.

14. The one or more non-transitory computer-readable media of any of clauses 11-13, wherein the instructions further cause the one or more processors to perform the steps of determining a first 3D geometry associated with the first facial identity based on the first input image and the second input image; determining a second 3D geometry associated with the second facial identity based on the first output image and the second output image; and determining a geometric consistency across the first input image, the second input image, the first output image, and the second output image based on the first 3D geometry and the second 3D geometry.

15. The one or more non-transitory computer-readable media of any of clauses 11-14, wherein the instructions further cause the one or more processors to perform the steps of converting a third input image into a third latent representation; generating, via the first machine learning model, a third output image based on the third latent representation; and training the first machine learning model based on a reconstruction loss that is computed between the third input image and the third output image.

16. The one or more non-transitory computer-readable media of any of clauses 11-15, wherein the first input image and the second input image are captured via a stereoscopic camera.

17. The one or more non-transitory computer-readable media of any of clauses 11-16, wherein one or more convolutional layers are applied to the first input image to generate the first latent representation.

18. The one or more non-transitory computer-readable media of any of clauses 11-17, wherein a decoder is applied to the first latent representation to generate the first output image based on a representation of the second facial identity.

19. The one or more non-transitory computer-readable media of any of clauses 11-18, wherein the representation of the second facial identity comprises at least one of the decoder, one or more parameters associated with the facial identity, or an identity vector.

20. In some embodiments, a system comprises one or more memories that store instructions, and one or more processors that are coupled to the one or more memories and, when executing the instructions, are configured to perform the steps of converting a first input image that depicts a first facial identity from a first viewpoint at a first time into a first latent representation; converting a second input image that depicts the first facial identity from a second viewpoint at the first time into a second latent representation; generating, via a first machine learning model, a first output image that depicts a second facial identity from the first viewpoint based on the first latent representation; and generating, via the first machine learning model, a second output image that depicts the second facial identity from the second viewpoint based on the second latent representation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing face swapping, the computer-implemented method comprising:
   converting a first input image that depicts a first facial identity from a first viewpoint at a first time into a first latent representation;
   converting a second input image that depicts the first facial identity from a second viewpoint at the first time into a second latent representation;
   generating, via a first machine learning model, a first output image that depicts a second facial identity from the first viewpoint based on the first latent representation;
   generating, via the first machine learning model, a second output image that depicts the second facial identity from the second viewpoint based on the second latent representation;
   determining a first three-dimensional (3D) geometry associated with the first facial identity based on the first input image and the second input image;
   determining a second 3D geometry associated with the second facial identity based on the first output image and the second output image; and
   training a first machine learning model based on a loss associated with the first 3D geometry and the second 3D geometry.

2. The computer-implemented method of claim 1, wherein determining the first 3D geometry and the second 3D geometry comprises:
   applying a second machine learning model to the first input image and the second input image to produce the first 3D geometry; and applying the second machine learning model to the first output image and the second output image to produce the second 3D geometry.

3. The computer-implemented method of claim 1, further comprising:
converting a third input image into a third latent representation;
generating, via the first machine learning model, a third output image based on the third latent representation; and
training the first machine learning model based on a loss associated with the third input image and the third output image.

4. The computer-implemented method of claim 3, wherein the first machine learning model comprises an encoder that converts the third input image into the third latent representation and a decoder that generates the third output image based on the third latent representation.

5. The computer-implemented method of claim 3, wherein the loss comprises a reconstruction loss between the third input image and the third output image.

6. The computer-implemented method of claim 1, further comprising converting a source image that depicts the first facial identity from a third viewpoint into the first input image and the second input image.

7. The computer-implemented method of claim 1, wherein generating the first output image comprises decoding the first latent representation based on a representation of the second facial identity.

8. The computer-implemented method of claim 1, wherein the first facial identity and the second facial identity comprise at least one of a personal identity, an age, or a lighting condition.

9. The computer-implemented method of claim 1, wherein the first input image and the second input image are captured via a stereoscopic camera.

10. One or more non-transitory computer-readable media storing instructions that, when executed by one or more processors, cause the one or more processors to perform the steps of:
converting a first input image that depicts a first facial identity from a first viewpoint at a first time into a first latent representation;
converting a second input image that depicts the first facial identity from a second viewpoint at the first time into a second latent representation;
generating, via a first machine learning model, a first output image that depicts a second facial identity from the first viewpoint based on the first latent representation;
generating, via the first machine learning model, a second output image that depicts the second facial identity from the second viewpoint based on the second latent representation;
determining a first three-dimensional (3D) geometry associated with the first facial identity based on the first input image and the second input image;
determining a second 3D geometry associated with the second facial identity based on the first output image and the second output image; and
training a first machine learning model based on a loss associated with the first 3D geometry and the second 3D geometry.

11. The one or more non-transitory computer-readable media of claim 10, wherein the first 3D geometry and the second 3D geometry are determined by at least one of a second machine learning model or a stereo matching technique.

12. The one or more non-transitory computer-readable media of claim 10, wherein the instructions further cause the one or more processors to perform the steps of:
determining a first 3D geometry associated with the first facial identity based on the first input image and the second input image;
determining a second 3D geometry associated with the second facial identity based on the first output image and the second output image; and
determining a geometric consistency across the first input image, the second input image, the first output image, and the second output image based on the first 3D geometry and the second 3D geometry.

13. The one or more non-transitory computer-readable media of claim 10, wherein the instructions further cause the one or more processors to perform the steps of:
converting a third input image into a third latent representation;
generating, via the first machine learning model, a third output image based on the third latent representation; and
training the first machine learning model based on a reconstruction loss that is computed between the third input image and the third output image.

14. The one or more non-transitory computer-readable media of claim 10, wherein the first input image and the second input image are captured via a stereoscopic camera.

15. The one or more non-transitory computer-readable media of claim 10, wherein one or more convolutional layers are applied to the first input image to generate the first latent representation.

16. The one or more non-transitory computer-readable media of claim 10, wherein a decoder is applied to the first latent representation to generate the first output image based on a representation of the second facial identity.

17. The one or more non-transitory computer-readable media of claim 10, wherein the representation of the second facial identity comprises at least one of the decoder, one or more parameters associated with the facial identity, or an identity vector.

18. A system, comprising:
one or more memories that store instructions, and
one or more processors that are coupled to the one or more memories and, when executing the instructions, are configured to perform the steps of:
converting a first input image that depicts a first facial identity from a first viewpoint at a first time into a first latent representation;
converting a second input image that depicts the first facial identity from a second viewpoint at the first time into a second latent representation;
generating, via a first machine learning model, a first output image that depicts a second facial identity from the first viewpoint based on the first latent representation;
generating, via the first machine learning model, a second output image that depicts the second facial identity from the second viewpoint based on the second latent representation;
determining a first three-dimensional (3D) geometry associated with the first facial identity based on the first input image and the second input image;

determining a second 3D geometry associated with the
second facial identity based on the first output image
and the second output image; and
training a first machine learning model based on a loss
associated with the first 3D geometry and the second
3D geometry.

\* \* \* \* \*